(12) United States Patent
Edwards

(10) Patent No.: US 12,448,592 B2
(45) Date of Patent: Oct. 21, 2025

(54) HOME BREWING DEVICE

(71) Applicant: Harrison Edwards, Herdfordshire (GB)

(72) Inventor: Harrison Edwards, Herdfordshire (GB)

( * ) Notice: Subject to any disclaimer, the term of this patent is extended or adjusted under 35 U.S.C. 154(b) by 988 days.

(21) Appl. No.: 17/252,900

(22) PCT Filed: Jun. 17, 2019

(86) PCT No.: PCT/GB2019/051671
§ 371 (c)(1),
(2) Date: Dec. 16, 2020

(87) PCT Pub. No.: WO2019/243783
PCT Pub. Date: Dec. 26, 2019

(65) Prior Publication Data
US 2021/0261894 A1 Aug. 26, 2021

(30) Foreign Application Priority Data

| Jun. 18, 2018 | (GB) | .................................... | 1809922 |
| Nov. 12, 2018 | (GB) | .................................... | 1818402 |
| Mar. 13, 2019 | (GB) | .................................... | 1903439 |

(51) Int. Cl.
*C12C 13/10* (2006.01)
*C12C 11/11* (2019.01)
*B01D 39/20* (2006.01)
*B01D 46/24* (2006.01)

(52) U.S. Cl.
CPC .............. *C12C 13/10* (2013.01); *C12C 11/11* (2013.01); *B01D 39/2058* (2013.01); *B01D 46/2411* (2013.01)

(58) Field of Classification Search
CPC ............................. C12C 11/006; C12C 13/10
See application file for complete search history.

(56) References Cited

U.S. PATENT DOCUMENTS

| 3,954,178 | A | * | 5/1976 | Mason, Jr. | ............. | B65D 71/00 |
| | | | | | | 206/508 |
| 4,550,024 | A | * | 10/1985 | Ie Granse | ........... | A47J 31/0642 |
| | | | | | | 426/77 |
| 4,557,186 | A | * | 12/1985 | Brown | ..................... | G01N 9/18 |
| | | | | | | 99/278 |
| 6,339,985 | B1 | * | 1/2002 | Whitney | ............... | A47J 31/505 |
| | | | | | | 99/290 |
| 8,993,273 | B1 | * | 3/2015 | Blichmann | ............. | C12C 13/10 |
| | | | | | | 435/93 |

(Continued)

FOREIGN PATENT DOCUMENTS

| CN | 204589130 U | * | 8/2015 | | |
| DE | 4419942 A1 | * | 12/1994 | ............. | A47J 31/02 |

(Continued)

OTHER PUBLICATIONS

CN 204589130 U (Sun, Ke) Aug. 26, 2015 [retrieved on Jan. 13, 2024]. Retrieved from Foreign Image and Text Database, translation by Clarivate Analytics. (Year: 2015).*

*Primary Examiner* — John J Norton

(57) ABSTRACT

A first container for delivery of a fluid by way of a filtering device to a fermenting vessel, the fermenting vessel being connected to a fluid storage container, the first container, the fermenting vessel and the storage container being arranged in a substantially vertical stack.

6 Claims, 3 Drawing Sheets

(56) References Cited

U.S. PATENT DOCUMENTS

| | | | | |
|---|---|---|---|---|
| 2009/0285971 | A1* | 11/2009 | Broderick | C12C 13/10 426/627 |
| 2016/0186108 | A1* | 6/2016 | Kucera | C12C 13/10 99/275 |
| 2016/0326471 | A1* | 11/2016 | Aown | C12C 13/10 |
| 2017/0130177 | A1* | 5/2017 | Geiger | C12C 7/06 |
| 2017/0360251 | A1* | 12/2017 | Miller | A47J 31/0631 |
| 2019/0136164 | A1* | 5/2019 | Van De Kooij | C12C 7/26 |

FOREIGN PATENT DOCUMENTS

| | | | | |
|---|---|---|---|---|
| GB | 2532931 | A * | 6/2016 | C12C 13/10 |
| KR | 20150121752 | A * | 10/2015 | A47J 31/0642 |
| NL | 1003184 | C2 * | 11/1997 | A47J 31/02 |

* cited by examiner

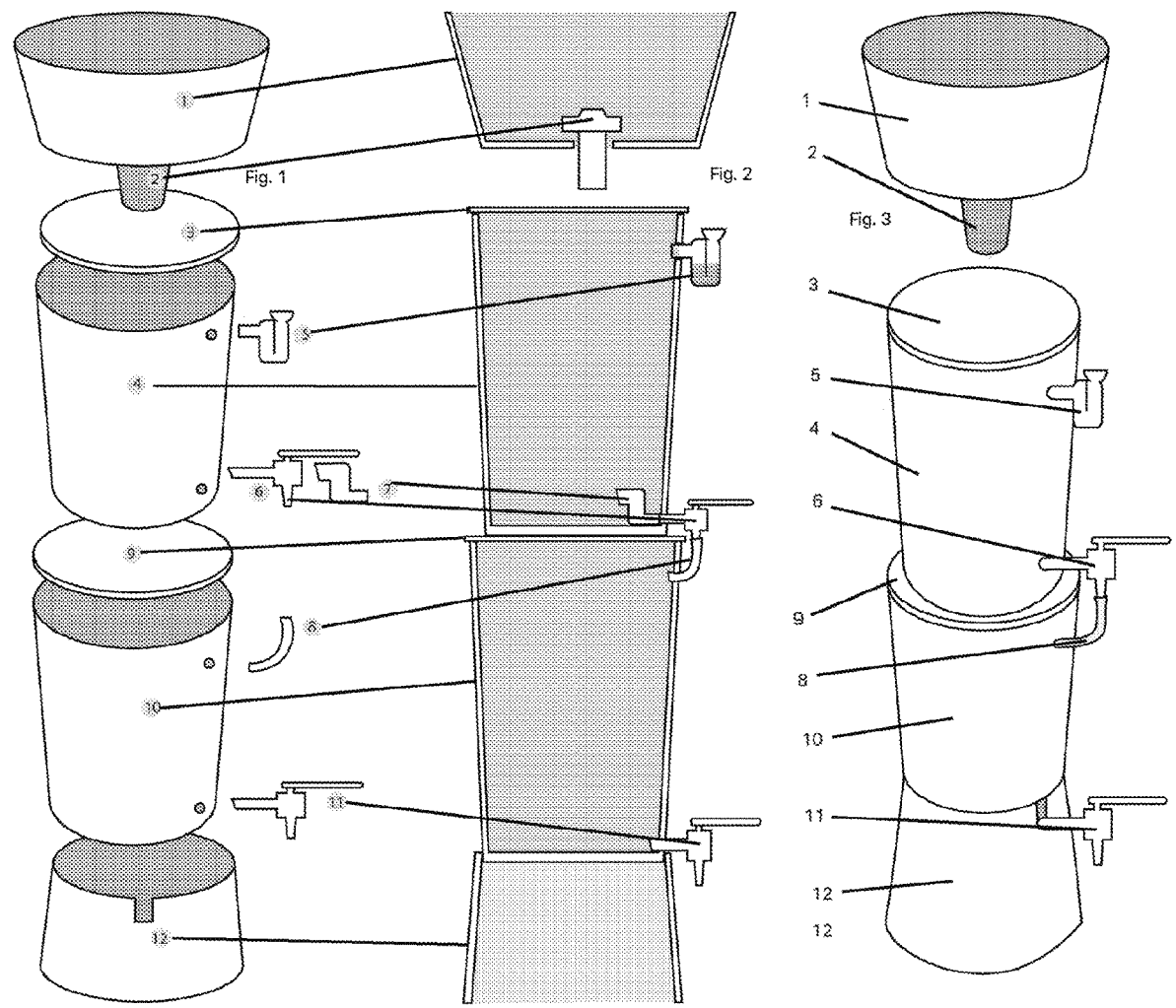
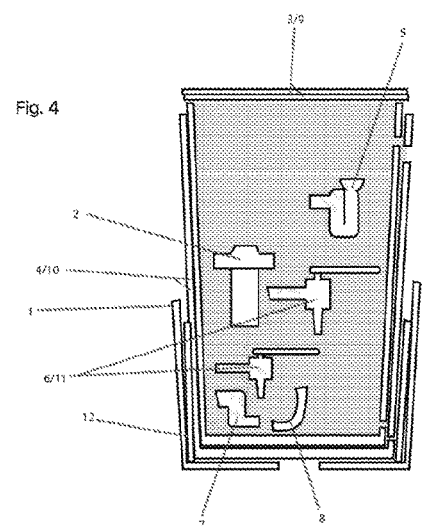

HOME BREWING DEVICE

This invention relates to a home brewing device for brewing alcoholic beverages, such as beer and wine.

Generally speaking, in order to brew alcoholic beverages such as beer and wine three items are needed, a primary fermentation vessel, a secondary container and distilled water. Sugar, yeast and distilled water are added to the primary fermentation vessel which is sealed with a one-way air-lock valve to enable carbon dioxide created by the yeast to escape. Once the fermentation is completed in about a week, the yeast dies and falls to the bottom of the vessel as sediment. The liquid in the primary vessel needs to be carefully siphoned into the secondary container without sucking up any of the dead yeast. The siphoned liquid can be left to age and the fresh or aged liquid can then be transferred into bottles through a second siphoning.

These items can occupy a lot of floor space whilst in operation and the siphoning of the liquid from the primary vessel into the secondary container can be difficult to do for beginners and can be messy. In addition, if the sediment is also siphoned, which can often happen with beginners, it can seriously affect the quality of the final beverage.

According to one aspect of the present invention, there is provided apparatus comprising a first container for delivery of a fluid by way of a filtering device to a fermenting vessel, the fermenting vessel being connected to a fluid storage container, the first container, the fermenting vessel and the storage container being arranged in a substantially vertical stack.

Owing to this aspect, it is possible to provide a home brewing device with a minimal footprint and in which the fluid flows from one container to another under gravity without the need for siphoning equipment and without the mess of manually siphoning the fluid.

Advantageously, the whole stack is raised upon a pedestal unit for ease of decanting the fluid from the bottom storage container into bottles or the like.

According to a second aspect of the present invention, there is provided a brewing device comprising a filtering section in the upper part of the brewing device through which a liquid flows, an ingredients section in which brewing ingredients are contained and located downstream of the filtering section and a housing containing the filtering section and the ingredients section.

Owing to this aspect, it is possible to provide an all-in-one brewing cartridge for the filter and pre-mixed ingredients for brewing.

In order that the present invention can be clearly and completely disclosed, reference will now be made, by way of example, to the accompanying drawings in which:—

FIG. 1 shows a perspective exploded view of a gravity assisted home brewing device;

FIG. 2 is a schematic cross-sectional view of the home brewing device;

FIG. 3 shows a perspective view of the gravity assisted home brewing device;

FIG. 4 shows a schematic representation of the gravity assisted home brewing device in a compact, packaged state;

Figures 5, 6:
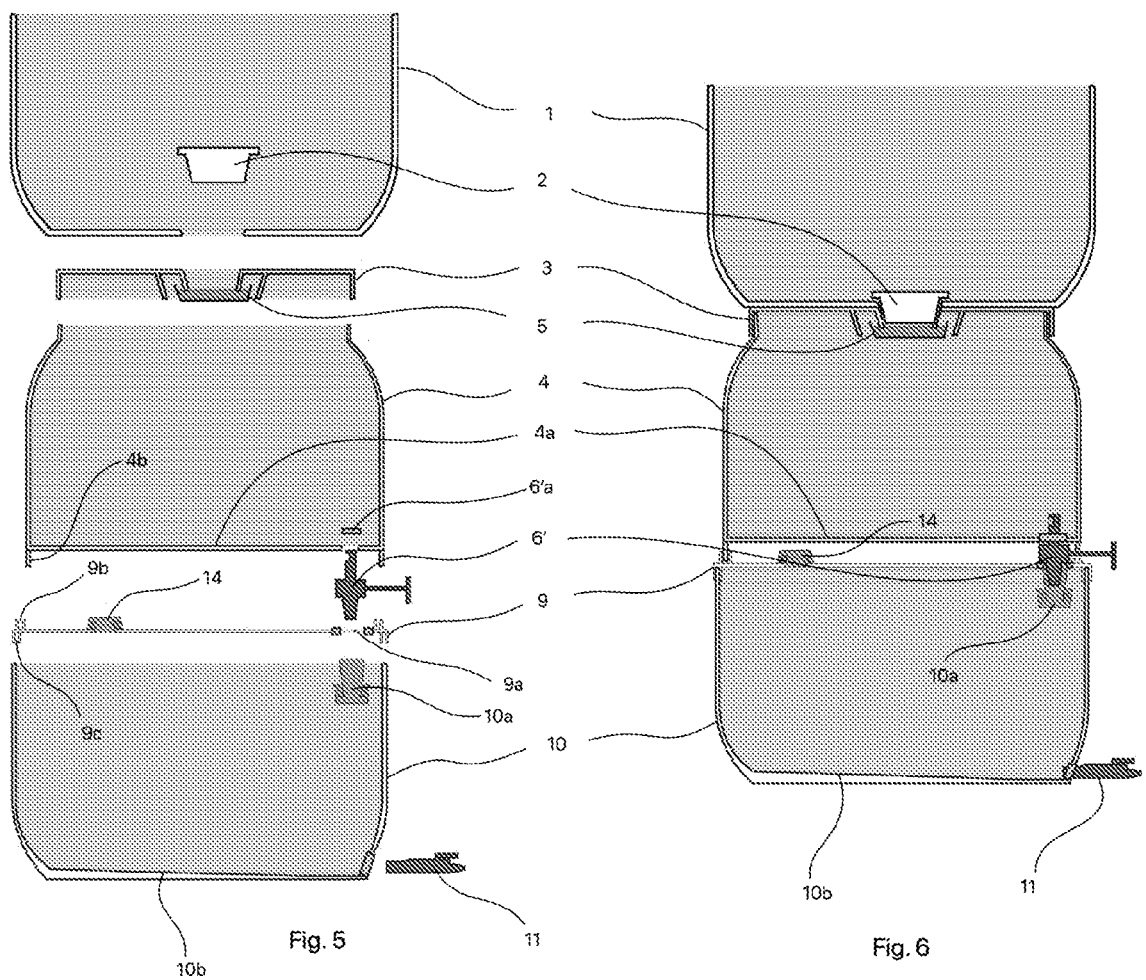
FIG. 5 shows a schematic cross-sectional view of a second variation of the gravity assisted home brewing device.
FIG. 6 shows a schematic cross-sectional view of the second variation but in a non-exploded form

Referring to the drawings, a gravity assisted home brewing device comprises a substantially vertical stack of containers including a first container 1 for containing a fluid, preferably water, a filtering device 2 being connected to the first container 1 for filtering impurities from the water. The filtering device is preferably a reverse osmosis filter usually lined with active charcoal, however any filtering device that has the ability to remove chlorine from the water would be suitable.

Advantageously, the filtering device is a simple drop-in friction fit funnel that can be readily removed and replaced.

The first container 1 sits stably on top of a fermenting vessel 4, when a lid 3 of the fermenting vessel is absent. Distilled/soft water is hard to obtain and needs to be filtered but since commonly known water filters only have a relatively low capacity of about one litre it would take 25 filling steps to fill a 25 litre capacity first container 1, which could take several hours to complete. By arranging a built-in filter device, water can be filtered with minimal effort.

The first container may also include a marking which indicates a maximum fill level.

The filter device is advantageously housed in a fluid-tight enclosure of the first container and arranged so that the filter device does not come into contact with any of the filtered water in the fermenting vessel.

The fermenting vessel 4 receives the filtered water from the first container 1, which is then removed from the stack and the water is mixed with ingredients for the particular beverage to be made; for example, for beer, malt and hops would be added to the fermenting vessel 4 to be mixed with the filtered water. Sugar and yeast are also added into the fermenting vessel 4. The lid 3 is then placed on the fermenting vessel 4 to seal it, which lid may be clamped in place with suitable clamping mechanisms around the periphery of the lid 3.

An airlock 5 filled with a liquid such as water and lid 3 is connected to an upper end region of the fermenting vessel 4 through a port to allow the escape of gas(es) from the fermenting vessel whilst the contents thereof are allowed to ferment over a period of time.

A temperature control device (not shown) may also be associated with the fermenting vessel 4 in order to control the fermenting temperature to suit the type of beverage being brewed in the stack.

The fermenting vessel towards its lower end includes an outlet port to which a first valve device 6 is connected. On the inside of the fermenting vessel 4, a tube of the first valve device 6 is connected to a Z-shaped fitting 7 which serves to prevent any, or very little at least, particulate sediment formed as a result of the fermentation process to leave the fermentation vessel 4 when the first valve device 6 is opened. Externally, the first valve device 6 has a transfer tube 8 connected thereto which, when the first valve is opened, carries fluid drained from the fermenting vessel 4 to a storage container 10 which is located directly beneath the fermenting vessel 4. The storage container 10 includes a second lid 9 upon which the fermenting vessel can sit in the stack. The transfer tube 8 enters the storage container 10 at an upper end region thereof through a suitably sized port. The fermentation process should be left to take place for around one week. Subsequently, the first valve 6 is activated draining the fluid into the storage container 10 wherein the fluid can be stored for up to about one month. At a lower end region of the storage container 10, a second valve device 11 is mounted through another port, the second valve device taking the form of, for instance, a simple faucet valve. The fluid that sits on top of any dead yeast sediment can be difficult to remove with a standard siphon. The arrangement of the first valve device 6 and the Z-shaped fitting 7 eliminates human error and is easier, especially for beginners.

The lid 9 must be made of a material strong enough to withstand the weight of the fermenting vessel above it and may also clamped to the storage container 10 in a similar manner to the lid 3 of the fermenting vessel described above.

Directly beneath the storage container, there is a pedestal unit 12 which raises the whole stack above the ground or floor to ease the filling of a cup or bottle into which the final product is to be decanted. When it is desired to imbibe the beverage brewed and stored in the container 10, the faucet valve is opened to enable a flow of the fluid through the faucet and into the suitably placed cup or bottle.

Referring specifically to FIG. 4, the components of the stack are designed to fit into a conveniently packaged form for sale and/or delivery and storage. The first container is designed to contain the pedestal unit 12 in an inverted position, with the fermenting vessel 4 and the storage container 10 fitting one inside the other and the lower end fitting into the inverted pedestal unit 12. Both of the lids 3 and 9 fit together and attach to the top of the inner one of the fermenting vessel 4 and the storage container 10. All of the other components such as the filter device 2, the airlock 5, the first valve device 6, the Z-shaped fitting 7, the transfer tube 8 and the second valve device 11 all fit within the inner one of the fermenting vessel 4 and the storage container 10. This forms a convenient package for transport.

Each of the ports in the fermenting vessel 4 and the storage container 10 may comprise rubber grommets to improve the liquid tightness.

The first and second valve devices are to be attached to the respective fermenting vessel 4 and storage container 10 by any suitable means.

Each of the fermenting vessel 4 and storage container 10 can weigh up to around 25 kg when there is liquid in them, and since each component of the stack is already in situ, no heavy lifting is required.

It is possible it provide a frame around the stack to define and maintain the position of the components of the stack.

The stack of the present invention provides a complete gravity-assisted home brewing device, where each step requires minimal effort on a user's part.

All of the components of the stack should be made from food grade materials in order to prevent chemical leaching into the brewed beverage.

Figure 7:
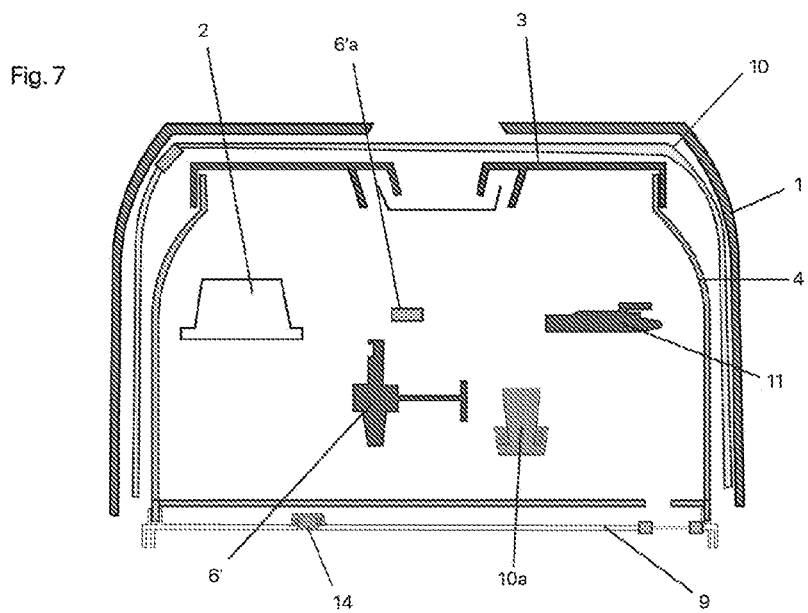
FIG. 7 shows a schematic cross-sectional view of the second variation in a packaged form.

Referring to FIGS. 5 to 7, the arrangement of the constituent parts in a second variation of the gravity assisted home brewing device is generally the same as that for FIGS. 1 to 4 except that many of the parts in FIGS. 1 to 4 which are located on the outside of the vessel 4 and the container 10 are contained within the outer boundary of the brewing device apart from an actuator of the first valve device 6 and the second valve device 11. Such an arrangement removes the needs for transfer tubes and there are less constituent parts that can be knocked and/or be damaged.

The airlock 5 is internally located and attached to the lid 3 of the fermenting vessel 4 of the filled with a liquid such as water and lid 3 is connected to an upper end region of the fermenting vessel 4 immediately beneath the outlet of the filtering device 2. The lid 3 friction fits on to the fermenting vessel 4 with a rubber seal.

The first container 1 is designed to be inverted once filtering is complete such that it snugly fits over the fermenting vessel 4.

At a base 4*a* of the fermentation vessel 4 there is an opening in the base to receive the first valve 6' secured internally of the fermentation vessel 4 by a threaded nut 6'*a* which secures over the body of the first valve 6' to provide a liquid-tight seal. The body of the first valve 6' extends downwardly so that its outlet is located in the top region of the container 10 via an opening 9*a* in the lid 9 of the container 10. The lid 9 includes an upwardly facing circumferential groove 9*b* which receives a corresponding circumferential foot 4*b* of the fermenting vessel 4 which itself extends downwardly from the base 4*a* a short distance. The foot 4*b* and the upwardly facing circumferential groove 9*b* include cut-out regions where the actuator of the first valve device 6' extends radially outwardly of the device. The lid 9 also includes a downwardly facing circumferential groove 9*c* which receives a top edge region of the container 10. The presence of the circumferential foot 4*b* results in a gap between the outside surface of the base 4*a* and a top surface of the lid 9. The first valve 6' extends across this gap, which also houses a pressure relief valve 14 fitted into an opening in the lid 9, and which acts to reduce excess pressure build-up in the container 10. The outlet of the first valve 6' is sealingly seated in another opening in the lid 9 with the outlet connected to a toggle device 10*a* which threadingly engages with the lid 9 and includes a rubber sleeve to create a liquid-tight seal with the outlet of the transfer valve 6'. When inserted into the toggle device, an end of the first valve 6' pushes downwardly on a spring-biased member of the toggle device 10*a* in order to open it and the spring-biased member closes the toggle device when the first valve 6' is removed from it.

The container 10 may have a sloping internal base 10*b* surface sloped downwardly toward the inlet of the second valve device 11 to assist in the outflow of as much fluid from the container 10 as is possible.

The second valve device 11 may contain a fine mesh filter to trap any excess sediment possibly present.

Referring specifically to FIG. 7, the components of the stack, as with the version shown in FIG. 4, are designed to fit into a conveniently packaged form for sale and/or delivery and also for storing the brewing device. The first container 1 is designed to be inverted to fit over the container 10 (also inverted) and the fermenting vessel 4. The lid 3 is fitted to the fermenting vessel and the lid 9 is attached to the foot 4*b*. All of the other components fit within the inner volume of the fermenting vessel 4. This forms a convenient package for transport.

In relation to both versions of the brewing device shown in the Figures, one important aspect is that once fermentation has completed in the fermenting vessel 4 and the alcohol containing fluid has been transferred into the storage container 10 in order to appropriately age, this allows another batch of fluid, once the transfer valve 6, 6' has been closed, to go through the fermentation process while the previous batch is aging in the storage container 10, essentially cutting the total production time for the consecutive batch in half. In this respect, the fermenting vessel may also be provided with a cleaning outlet valve so that the fermenting vessel 4 can remain in situ whilst it is cleansed/sterilised and any cleansing/sterilising fluid can be extracted from the fermenting vessel 4. In this way, the vertical stack would not have to be disturbed to any great extent. However, if the transfer valve 6, 6' also needed cleansing/sterilising, then the fermenting vessel would have to be temporarily removed from the stack as would the first container 1.

Figure 8:
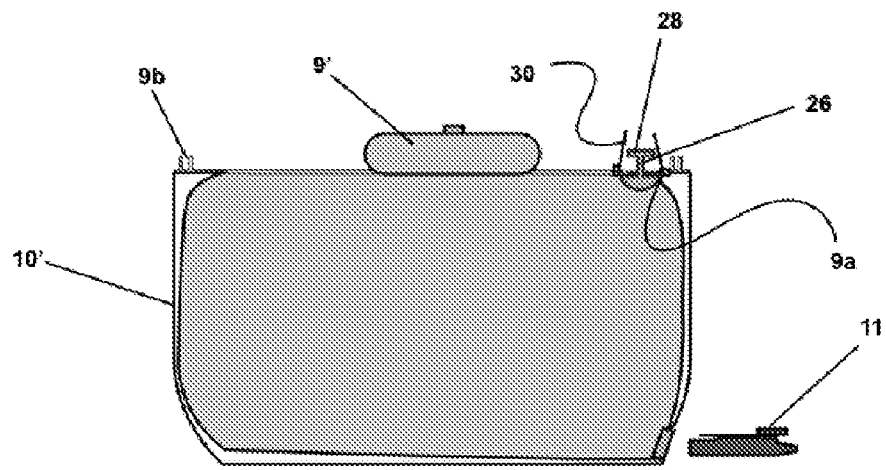
FIG. 8 shows a schematic cross-sectional view of a variation of a component of the home brewing device.

FIG. 8 shows an alternative container 10' in the form of a pressure-bearing container in order to provide the ability to carbonate the brewed liquid. The alternative container 10' comprises thickened walls having internally curved surfaces at the top corner regions to aid in withstanding an increased internal pressure, which will be about 10 to 15 psi, regulated by way of the lid 9' including gas injection means 24 for allowing the injection of a gaseous substance, such as carbon dioxide, into the container 10'. The lid 9' is screw threaded to screw onto a corresponding thread on a neck portion of the container 10'. The gas to be injected into the container 10' originates from an external source. In a similar manner to that of the container 10 shown in FIG. 5, the top external surface of the container 10' may have the upwardly facing circumferential groove 9b integrated to receive the corresponding circumferential foot 4b of the fermenting vessel 4. The container 10 further comprises a simple one-way lock valve 26 located in the opening 9a of the top surface of the container 10' of which a plunger part 28 is under a spring bias to be in a closed position. The outlet of the transfer valve 6' from the fermenting vessel 4 immediately above fits into a collar 30 and presses the plunger part 28 downwardly to open the lock valve 26, thereby allowing the brewed liquid to flow from the fermenting vessel 4 into the container 10'. Upon removal of the fermenting vessel 4, the plunger part 28 closes under its spring bias to create an air-tight seal of the opening 9a. In this way, the container 10 can be removed for storage/consumption whilst the fermenting vessel 4 can be used to for further brewing.

Figure 9:
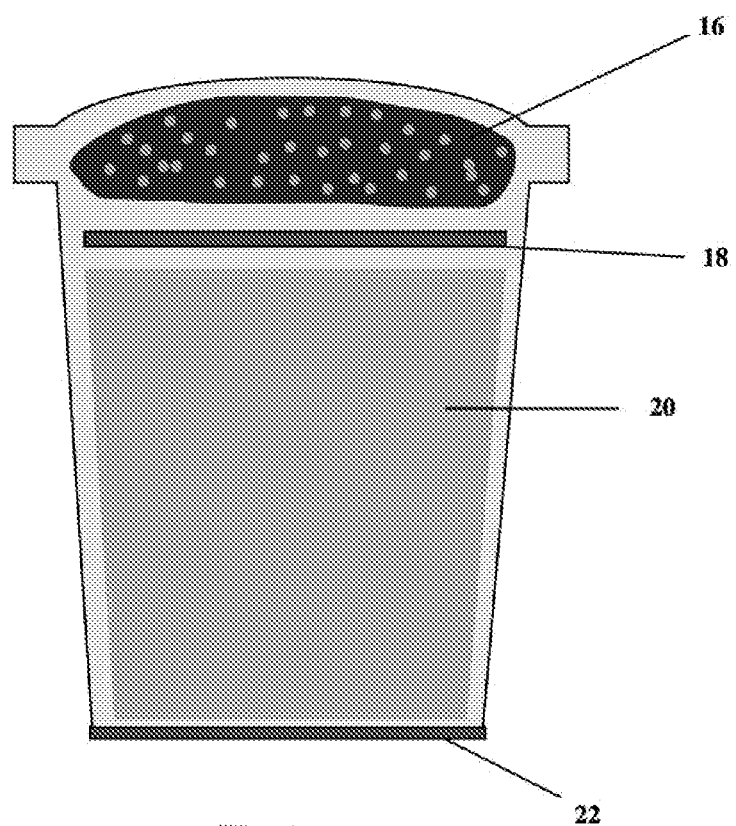
FIG. 9 shows a schematic view of a filtering device which also includes brewing ingredients.

Referring to FIG. 9, the filtering device 2 of the previous Figures can include, within the filtering device itself, the brewing ingredients downstream of a filter section of the filtering device. As a result the filtering device 2 may comprise a filter section 16 at its upper end, which contains, for example, an activated charcoal type of filter or the like with filtering particles contained therein. In the filtering section and immediately downstream of the filter is a filtering mesh or membrane 18 with an appropriate pore size followed downstream by an ingredient section 20 which houses the appropriate brewing ingredients. Immediately downstream of the ingredient section 20 there is a second mesh or membrane 22 with an appropriate pore size through which liquid flows into the fermenting vessel 4. Such a filtering device is a single-use cartridge unit to be replaced when a new batch is to be brewed, so that the filtering device 2 can be supplied separately in various varieties.

I claim:

1. A vertically arrayable and stackable alcoholic beverage-making apparatus, comprising:
   (a) a fluid delivery vessel;
   (b) a fermenting vessel positionable below and in fluid communication with the fluid delivery vessel;
   (c) a replaceable single use brewing cartridge removably emplaceable in the fermenting vessel and in fluid communication therewith, the brewing cartridge comprising a housing and an ingredients section emplaced therein containing brewing ingredients, the brewing cartridge further comprising a filtering device by way of which a fluid is transferred from the fluid delivery vessel to the fermenting vessel; and
   (d) a fluid storage container positionable beneath the fermenting vessel and in fluid communication therewith,
      and wherein a fluid is delivered by gravity from the fluid delivery vessel through the filtering device to the fermenting vessel and therefrom to the storage container, the filtering device being a drop-in friction fit funnel.

2. The alcoholic beverage-making apparatus according to claim 1, and further comprising a frame around the stackable apparatus.

3. The alcoholic beverage-making apparatus according to claim 1, wherein the storage container includes a sloping internal base.

4. The alcoholic beverage-making apparatus according to claim 1, wherein the storage container is a pressure-bearing container.

5. A vertically arrayable and stackable alcoholic beverage-making apparatus, comprising:
   (a) a fluid delivery vessel;
   (b) a fermenting vessel positionable below and in fluid communication with the fluid delivery vessel;
   (c) a replaceable single use brewing cartridge removably emplaceable in the fermenting vessel and in fluid communication therewith, the brewing cartridge comprising a housing and an ingredients section emplaced therein containing brewing ingredients, the brewing cartridge further comprising a filtering device by way of which a fluid is transferred from the fluid delivery vessel to the fermenting vessel; and
   (d) a fluid storage container positionable beneath the fermenting vessel and in fluid communication therewith,
      wherein a fluid is delivered by gravity from the fluid delivery vessel, to the fermenting vessel through the filtering device and therefrom to the storage container;
      and farther wherein the filtering device is housed in a fluid tight enclosure of the fluid delivery vessel and connected to a fitting so that the filtering device does not come into contact with any filtered water in the fermenting vessel.

6. A vertically arrayable and stackable alcoholic beverage-making apparatus, comprising:
   (a) a fluid delivery vessel;
   (b) a fermenting vessel positionable below and in fluid communication with the fluid delivery vessel, the fermenting vessel including an outlet port towards its lower end to which a first valve device is connected, the fermenting vessel having a tube deposited therein connected to the first valve device, the tube being connected to a fitting to prevent substantially any particulate sediment formed as a result of the fermentation process from leaving the fermentation vessel when the first valve device is opened;
   (c) a replaceable single use cartridge removably emplaceable in the fermenting vessel and in fluid communication therewith, the cartridge comprising a housing and an ingredients section emplaced therein containing brewing ingredients, the brewing cartridge further comprising a filtering device by way of which a fluid is transferred from the fluid delivery vessel to the fermenting vessel; and
   (d) a fluid storage container positionable beneath the fermenting vessel and in fluid communication therewith,
      and wherein a fluid is delivered by gravity from the fluid delivery vessel to the fermenting vessel through the filtering device and therefrom to the storage container, the storage container having a lid which has an upwardly facing circumferential groove arranged to secure a corresponding circumferential foot of the fermenting vessel, and further wherein the foot and the upwardly facing circumferential groove includes a cut-out region from where an actuator extends radially from the device.

\* \* \* \* \*